United States Patent [19]

Takei et al.

[11] Patent Number: 5,559,615
[45] Date of Patent: Sep. 24, 1996

[54] POLYMER DISPERSED LIQUID CRYSTAL DISPLAY DEVICE

[75] Inventors: Jiro Takei, Tama; Tetsushi Yoshida, Segamiko-machi; Zenta Kikuchi, Hamura, all of Japan

[73] Assignee: Casio Computer Co., Ltd., Tokyo, Japan

[21] Appl. No.: 317,242

[22] Filed: Oct. 3, 1994

[30] Foreign Application Priority Data

Oct. 7, 1993 [JP] Japan .................................. 5-251976
Oct. 7, 1993 [JP] Japan .................................. 5-251978

[51] Int. Cl.$^6$ .......................... G02F 1/1335; G02F 1/13
[52] U.S. Cl. ........................ 357/50; 359/51; 359/52
[58] Field of Search ...................... 359/50, 51, 52; 350/160 LC, 41, 92 C

[56] References Cited

U.S. PATENT DOCUMENTS

| | | | |
|---|---|---|---|
| 3,998,526 | 12/1976 | Katz | 350/160 LC |
| 4,435,047 | 3/1984 | Fergason. | |
| 4,688,900 | 8/1987 | Duane et al. | 359/52 |
| 5,146,355 | 9/1992 | Prince et al. | 359/50 |
| 5,303,073 | 4/1994 | Shirota et al. | 359/94 |
| 5,342,545 | 8/1994 | Yamada et al. | 359/94 |
| 5,394,256 | 2/1995 | Yamada et al. | 359/51 |

FOREIGN PATENT DOCUMENTS

| | | |
|---|---|---|
| 4-119320 | 4/1992 | Japan . |
| 5-88150 | 4/1993 | Japan . |
| WO92/14181 | 8/1992 | WIPO . |

OTHER PUBLICATIONS

Fluorescence Activated LCD, Feb. 23, 1977 G. Baur and W. Greusel.
Feinwerktechnik = Messtechnik, vol. 98, No. ½, 1990, Muenchen de pp. 17–19, J. B. Ravenburg, "LCID EINE Neue Flüssigkristallanzeige" Chapter: Displays Basierend Auf Der Ncap–G–H Technik.

Patent Abstracts of Japan, vol. 17, No. 703 (P–1666) & JP–A–05 241 135 (Hitachi).

Primary Examiner—Wael Fahmy
Assistant Examiner—Fetsum Abraham
Attorney, Agent, or Firm—Frishauf, Holtz, Goodman, Langer & Chick

[57] ABSTRACT

A polymer dispersed liquid crystal display device includes an active element substrate on which active elements and pixel electrodes are arranged in the form of a matrix, a counter substrate having a counter electrode formed on a surface, of the counter substrate, opposing the active element substrate, and a polymer dispersed liquid crystal film arranged between the active element substrate and the counter substrate and formed by dispersing a polymer resin and a cholesteric liquid crystal. The cholesteric liquid crystal is in a randomly aligned state to be twisted at a specific helical pitch in the absence of an electric field. When an electric field is applied across the pixel electrodes and the counter electrode, the cholesteric liquid crystal is aligned along the electric field, and the polymer dispersed liquid crystal film is set in a light-transmitting state, thereby setting a display in a bright state. When the application of the electric field is stopped, the cholesteric liquid crystal is restored, within a short time, to a randomly twisted/aligned state by the restoring force of the cholesteric liquid crystal, and the polymer dispersed liquid crystal film is set in a light-scattering state, thereby setting a display in a dark state. When a dichroic dye is added to the cholesteric liquid crystal, the dark display becomes dark, thereby increasing the contrast of an image.

15 Claims, 8 Drawing Sheets

POLYMER DISPERSED LIQUID CRYSTAL DISPLAY DEVICE

BACKGROUND OF THE INVENTION

1. Field of the Invention

The present invention relates a polymer dispersed liquid crystal display device and, more particularly, to a polymer dispersed liquid crystal display device having a high response speed and capable of displaying an image having a high contrast.

2. Description of the Related Art

As a liquid crystal display device, a polymer dispersed liquid crystal display device has received a good deal of attention. A polymer dispersed liquid crystal display device is constituted by: a pair of substrates respectively having electrodes formed thereon; and a polymer dispersed liquid crystal film (a composite film consisting of a polymer resin and a liquid crystal) arranged between the pair of substrates and having a structure in which the polymer resin and the liquid crystal are dispersed.

As a liquid crystal constituting a polymer dispersed liquid crystal film, a nematic liquid crystal having positive dielectric anisotropy is used.

FIGS. 13A and 13B are enlarged sectional views respectively showing portions of the polymer dispersed liquid crystal film of a polymer dispersed liquid crystal display device. The polymer dispersed liquid crystal film shown in FIGS. 13A and 13B has a structure in which a nematic liquid crystal 102 is confined in spaces of a polymer resin 101 having a mesh-like sectional structure.

When no voltage is applied across the electrodes of both the substrates, an electric field is not applied to the polymer dispersed liquid crystal film. In this state, molecules LM of the nematic liquid crystal 102 in the polymer dispersed liquid crystal film have random directions, as shown in FIG. 13A.

In this state, the refractive indexes of the polymer resin 101 and the nematic liquid crystal 102 are different from each other, light incident on the liquid crystal display device is refracted and scattered at the interface between the polymer resin 101 and the nematic liquid crystal 102 and then scattered by the liquid crystal molecules LM having various directions. For this reason, a display becomes dark (turbid state).

When an electric field is applied across the electrodes of both the substrates, the molecules LM of the nematic liquid crystal 102 in the polymer dispersed liquid crystal film are uniformly aligned in the direction of the electric field as shown in FIG. 13B, i.e., in the direction almost perpendicular to the major surfaces of both the substrates. For this reason, the refractive index of the nematic liquid crystal 102 becomes almost equal to the refractive index of the polymer resin 101. Therefore, incident light is transmitted through the polymer dispersed liquid crystal film while almost no incident light is scattered, resulting in a bright display.

As described above, in the polymer dispersed liquid crystal display device, scattering and transmission of light in the polymer dispersed liquid crystal film are controlled by controlling a voltage applied across the electrodes, thereby displaying an image.

This polymer dispersed liquid crystal display device can display an image (bright/dark image) without using a polarizing plate. Therefore, unlike a generally used TN type liquid crystal display device or the like, an amount of light is not lost by optical absorption of a polarizing plate. Therefore, a screen brighter than that of a TN type liquid crystal display device can be obtained.

However, a conventional polymer dispersed liquid crystal display device has a low response speed, and a display image disadvantageously has a low contrast.

First, in consideration of the problem of a low response speed, when an electric field is applied, the liquid crystal molecules LM of the nematic liquid crystal 102 used in the polymer dispersed liquid crystal film are aligned in the direction of the electric field within a relatively short time in accordance with the strength of the applied electric field. However, when the application of the electric field is stopped, and the absence of an electric field is set, the direction of the liquid crystal molecules LM cannot be controlled by an electric field. For this reason, the state of the liquid crystal molecules LM is naturally returned to randomly aligned state. Therefore, it takes a long time to change the state of the display from a bright state to a dark state.

In this manner, a conventional polymer dispersed liquid crystal display device has a high response speed at which the state of the display is changed from the dark state to the bright state but a low response speed at which the state of the display is changed from the bright state to the dark state. Therefore, for example, a multiplex-driven liquid crystal display device cannot be easily time-sharing-driven at a high duty ratio.

In consideration of the problem of the low contrast of the display image, the molecules LM of the nematic liquid crystal 102 tend to be aligned along the inner surface of the polymer resin 101 in the absence of an electric field. For this reason, even when the molecules LM have random directions, the liquid crystal molecules LM are partially aligned in almost the same direction near the interface between the polymer resin 101 and the nematic liquid crystal 102 as shown in FIG. 13A.

For this reason, in a conventional polymer dispersed liquid crystal display device, the difference between the refractive indexes of the nematic liquid crystal 102 and the polymer resin 101 is small in the absence of an electric field. Therefore, the scattering efficiency of light is low, and the darkness of a dark display is insufficient, resulting in a display having a low contrast.

SUMMARY OF THE INVENTION

It is an object of the present invention to provide a polymer dispersed liquid crystal display device having a high response speed at which the state of a display is changed from a dark state to a bright state and a high response speed at which the state of a display is changed from the bright state to the dark state.

It is another object of the present invention to provide a polymer dispersed liquid crystal display device comprising a polymer dispersed liquid crystal film having a high light-scattering efficiency in the absence of an electric field.

It is still another object of the present invention to provide a polymer dispersed liquid crystal display device capable of displaying an image having a high contrast.

In order to achieve the above objects, a polymer dispersed liquid crystal display device according to the first aspect of the present invention comprises:

a pair of substrates arranged to oppose one another and electrodes respectively formed on opposing surfaces of the pair of substrates; and a polymer dispersed liquid crystal film arranged between the pair of substrates and formed by dispersing a polymer resin and a cholesteric liquid crystal.

In order to achieve the above objects, an active matrix polymer dispersed liquid crystal display device according to the second aspect of the present invention comprises:

a first substrate on which active elements and pixel electrodes respectively connected to the active elements are arranged in the form of a matrix;

a second substrate arranged to oppose the first substrate and having a counter electrode formed on a surface, of the counter substrate, opposing the first substrate; and a polymer dispersed liquid crystal film arranged between the first substrate and the second substrate and formed by dispersing a polymer resin and a cholesteric liquid crystal.

The cholesteric liquid crystal may contain a dichroic dye.

In the polymer dispersed liquid crystal display devices according to the first and second aspects of the present invention, a cholesteric liquid crystal is used as a liquid crystal. The cholesteric liquid crystal has the lowest energy when the cholesteric liquid crystal forms a twisted structure having a period of a predetermined pitch. For this reason, in the absence of an electric field, the cholesteric liquid crystal is aligned to be twisted at a period of a predetermined pitch.

When an electric field is applied to the cholesteric liquid crystal, the cholesteric liquid crystal is aligned almost perpendicular to a substrate surface at a speed depending on the strength of the electric field. On the other hand, when the application of the electric field is stopped, the state of the cholesteric liquid crystal is returned to a twisted/ aligned state so as to decrease the energy of the liquid crystal. For this reason, the polymer dispersed liquid crystal display device of the present invention has a high response speed at which the state of the display is changed from a dark state to a bright state and a high response speed at which the state of the display is changed from the bright state to the dark state. For this reason, a polymer dispersed liquid crystal display device having a total high response speed can be obtained. Therefore, for example, in the active matrix liquid crystal display device, a write time can be shortened, and a frame frequency can be increased. In addition, a multiplex-driven liquid crystal display device can driven at a high duty ratio.

Since liquid crystal molecules are set in a twisted/aligned state in the absence of an electric field, the randomness (degree) of alignment of liquid crystal molecules is high, and the difference between the refractive indexes of the polymer resin and liquid crystal constituting the polymer dispersed liquid crystal film is large. For this reason, the scattering efficiency of incident light is high, and a display can be made sufficiently dark. Therefore, a display image having a high contrast can be obtained.

In addition, when a dichroic dye is added to a cholesteric liquid crystal, a dark display can be made darker, and a display image having a higher contrast can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A polymer dispersed liquid crystal display device according to an embodiment of the present invention will be described below with reference to FIGS. 1 to 4B.

The polymer dispersed liquid crystal display device according to this embodiment is of an active matrix type, and is a reflection device in which light incident from the upper surface of the reflection device is reflected by a reflecting film arranged on a lower substrate to display an image.

Figure 1:
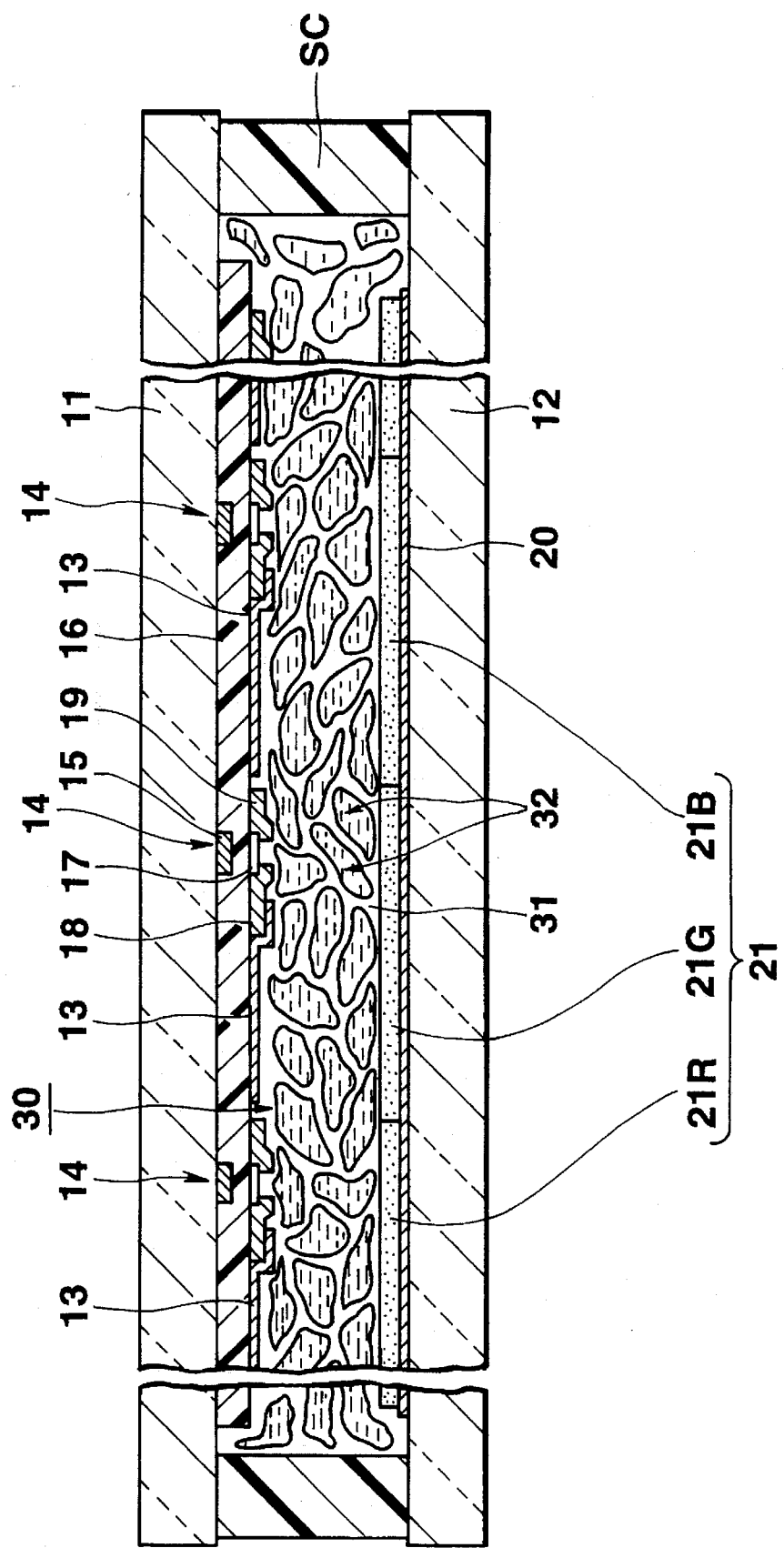
FIG. 1 is a sectional view showing a polymer dispersed liquid crystal display device according to an embodiment of the present invention.

The arrangement of the polymer dispersed liquid crystal display device according to this embodiment will be described with reference to FIGS. 1 and 2. FIG. 1 is a sectional view showing part of the liquid crystal display device. Referring to FIG. 1, an upper substrate 11 is an active element substrate on which active elements 14 are formed, and is arranged on the upper surface side of the polymer dispersed liquid crystal display device. A lower substrate 12 is a counter substrate opposing the active element substrate 11, and is arranged on the lower surface side of the device.

The active element substrate 11 is constituted by a transparent insulating substrate consisting of a glass plate. On the lower surface of the active element substrate 11, as shown in the plan view of FIG. 2, a plurality of transparent pixel electrodes 13 arranged in the form of a matrix in the row and column directions and a plurality of active elements 14 respectively corresponding to the pixel electrodes 13 are arranged.

Each active element 14 is constituted by, e.g., a TFT (thin film transistor). Each TFT 14 is constituted by: a gate electrode 15 formed on the active element substrate 11; a gate insulating film 16 covering the gate electrode 15; an intrinsic semiconductor film 17 consisting of a-Si (amorphous silicon) or the like and formed on the gate insulating film 16 to oppose the gate electrode 15; and source and drain electrodes 18 and 19 formed on both the side portions of the intrinsic semiconductor film 17.

Figure 2:
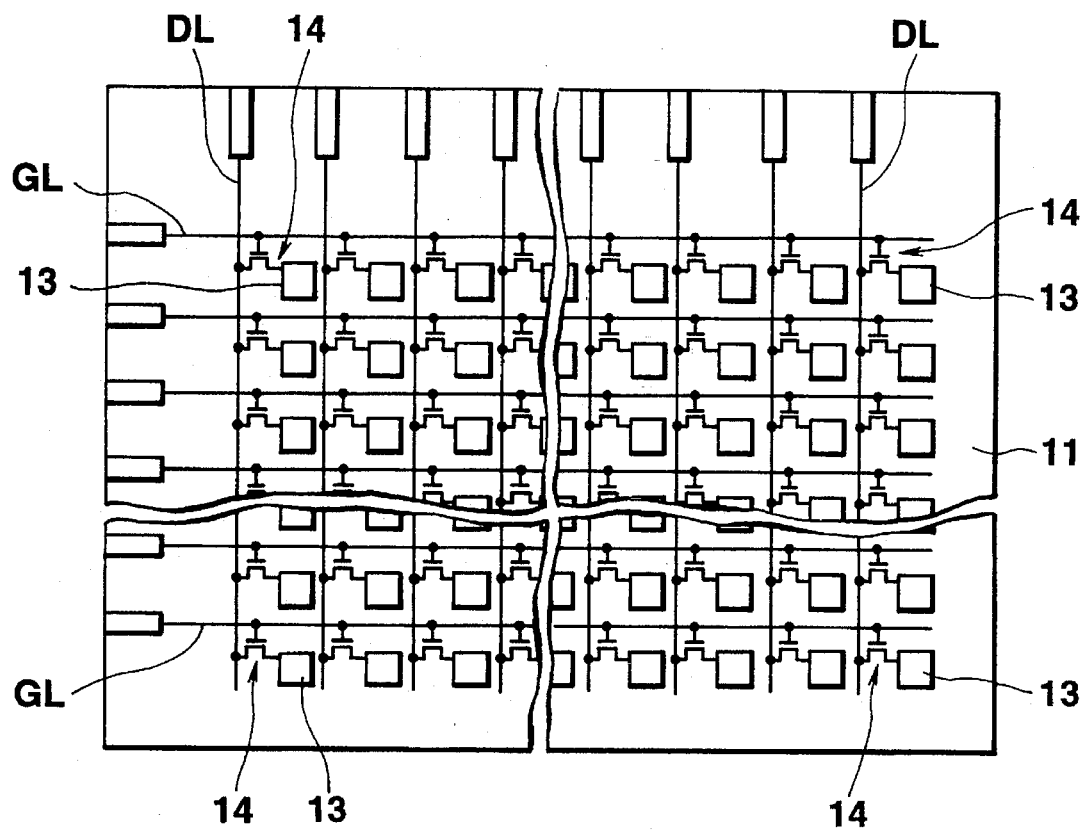
FIG. 2 is a plan view showing the arrangement of an active element substrate.

A gate line (address line) GL for supplying a gate signal to the TFT 14 and a data line DL for supplying a data signal corresponding to image data to the TFT 14 are arranged above the active element substrate 11 as shown in FIG. 2. The gate line GL is integrally formed with the gate electrode 15 of the TFT 14, and the data line DL is connected to the drain electrode 19.

The gate insulating film 16 of the TFT 14 is constituted by a transparent insulating film consisting of SiN (silicon nitride) or the like. Each pixel electrode 13 is formed on the gate insulating film 16 and has one end portion connected to the source electrode 18 of a corresponding one of the TFTs 14.

The lower substrate 12 is constituted by an insulating substrate (which need not be transparent). A counter electrode 20 opposing all the pixel electrodes 13 is almost entirely formed on the upper surface of the lower substrate 12. This counter electrode 20 consists of a metal film or the like-as of Al (aluminum) or Cr (chromium) having a high reflectivity and also serves as a reflecting film for reflecting light incident on the upper surface of the liquid crystal display device.

Figure 3:
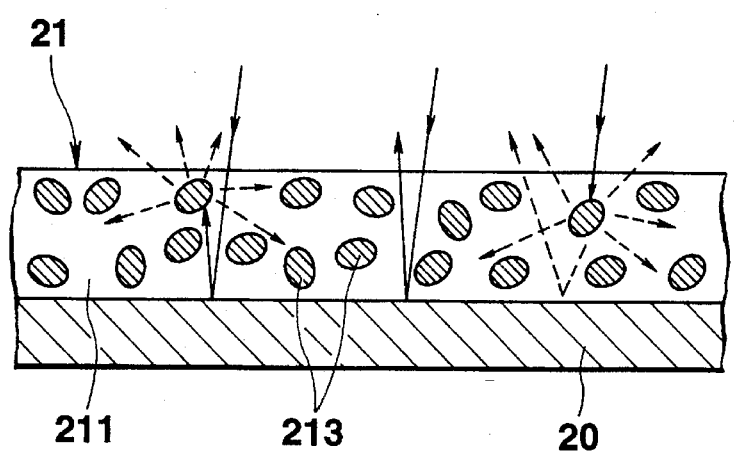
FIG. 3 is a view showing the arrangement of a fluorescent film.

A fluorescent film 21 for emitting fluorescent light upon incidence of light is formed on the counter electrode 20. The fluorescent film 21, as shown in FIG. 3, is constituted by: a transparent resin base material 211; and a granular fluorescent material 123 dispersed in the resin base 121.

When a color display is to be performed, as the fluorescent film 21, a plurality of fluorescent film sections 21R, 21G, 21B for emitting fluorescent light of different colors are sequentially arranged to respectively oppose the pixel electrodes 13. In this embodiment, the fluorescent film section 21R for emitting phosphorescent light of almost red, the fluorescent film section 21G for emitting phosphorescent light of almost green, and the fluorescent film section 21B for emitting phosphorescent light of almost blue are sequentially arranged to respectively oppose the pixel electrodes 13, thereby making a full color display possible.

The active element substrate 11 and the counter substrate 12 are jointed at their outer peripheral portions via a frame-like seal member SC. In an area surrounded by the seal member SC between the active element substrate 11 and the counter substrate 12, a composite film consisting of a liquid crystal and a polymer resin, i.e., a polymer dispersed liquid crystal film 30 is arranged.

The polymer dispersed liquid crystal film 30 has a structure in which a polymer resin 31 and a cholesteric liquid crystal 32 are dispersed. The polymer dispersed liquid crystal film 30, as shown in the enlarged views of FIGS. 4A and 4B, has a structure in which the cholesteric liquid crystal 32 is confined in spaces of the polymer resin 31 having a network- or sponge-like sectional structure.

The image display operation of the liquid crystal display device having the above arrangement will be described next with reference to FIGS. 1 to 4B.

The cholesteric liquid crystal 32 has the lowest internal energy when the cholesteric liquid crystal 32 is set in a twisted/aligned state at a specific pitch. In addition, liquid crystal molecules near the polymer resin 31 tend to be aligned along the surface of the polymer resin 31.

Figure 4A:
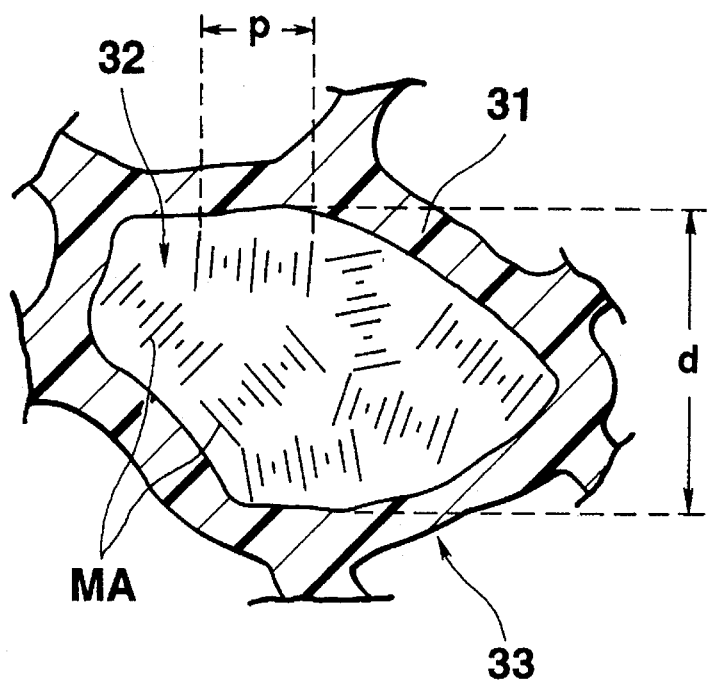
FIG. 4A is an enlarged view showing part of the polymer dispersed liquid crystal film shown in FIG. 1 to explain the aligned state of cholesteric liquid crystal molecules in the absence of an electric field.

For this reason, in the absence of an electric field, as shown in FIG. 4A, liquid crystal molecules MA are aligned in units of small areas to be twisted at a helical pitch p inherent in a liquid crystal, and the twisting axes have random directions in units of the small areas. In this state, the refractive index of the polymer resin 31 is different from that of the cholesteric liquid crystal 32. For this reason, light incident on the upper surface of the liquid crystal display device is largely refracted and scattered at the interface between the polymer resin 31 and the liquid crystal 32. In addition, the scattered light is also scattered by the liquid crystal molecules MA.

Some parts of the light scattered by the polymer dispersed liquid crystal film 30 reach the fluorescent film 21 (film sections 21R, 21G, and 21B). Some parts of the light reaching the fluorescent film 21 are incident on the fluorescent material 213 in the fluorescent film 21 to emit fluorescent light. Light transmitted through the fluorescent film 21 without being incident on the phosphorescent material 213 are reflected by the counter electrode 20. However, a small amount of light reaches the fluorescent film 21 (film sections 21R, 21G, and 21B) and the counter electrode 20, and the amount of phosphorescent light emitted from the fluorescent film 21 and the amount of light reflected by the counter electrode 20 are small. In addition, the phosphorescent light emitted from the fluorescent film 21 and the light reflected by the counter electrode 20 are scattered while passing through the polymer dispersed liquid crystal film 30 again. Therefore, almost no light emerges from the upper surface of the polymer dispersed liquid crystal display device, and the display becomes sufficiently dark.

Figure 4B:
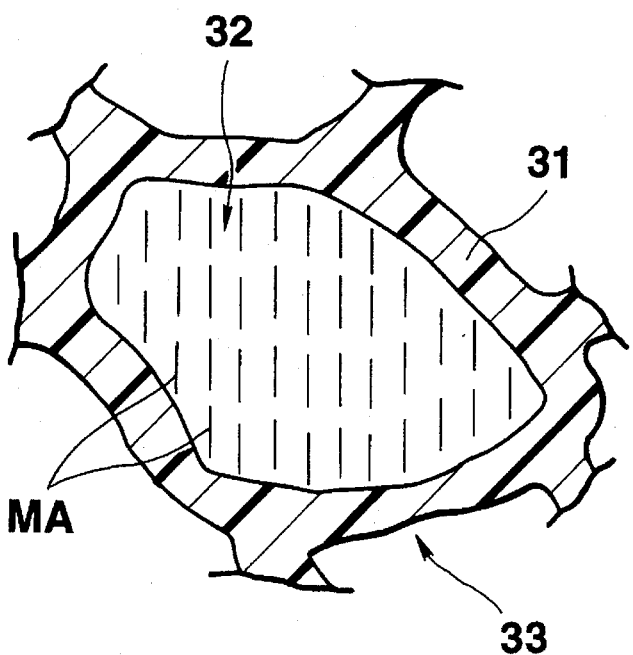
FIG. 4B is an enlarged view showing part of the polymer dispersed liquid crystal film shown in FIG. 1 to explain the aligned state of the cholesteric liquid crystal molecules in the presence of an electric field.

When an electric field is applied to the cholesteric liquid crystal 32, the liquid crystal molecules MA, as shown in FIG. 4B, are uniformly aligned parallel to the electric field (perpendicular to the major surfaces of the substrates).

In this state, the refractive index of the polymer resin 31 becomes almost equal to that of the cholesteric liquid crystal 32. Light incident from the polymer dispersed liquid crystal film 30 is transmitted through the polymer dispersed liquid crystal film 30 while almost not being scattered at the interface between the polymer resin 31 and the cholesteric liquid crystal 32, and the light is reflected by the counter electrode 20 also serving as a reflecting film, thereby obtaining a blight display.

Some parts of the light transmitted through the polymer dispersed liquid crystal film 30 and the light reflected by the counter electrode 20 collide with the phosphorescent material 213 in the fluorescent film 21 as indicated by the solid lines in FIG. 3. The phosphorescent material 213 absorbs the energy of the light colliding therewith to emit phosphorescent light of a predetermined wavelength (predetermined color). This phosphorescent light is directly reflected by the phosphorescent material 213 or reflected by the counter electrode 20 and transmitted through the polymer dispersed liquid crystal film 30 so as to emerge from the upper surface of the polymer dispersed liquid crystal display device.

For this reason, the display colors become equal to the colors of the phosphorescent light emitted from the fluorescent film 21 (film sections 21R, 21G, and 21B). As described above, the fluorescent film sections 21R, 21G, and 21B of different colors are arranged to oppose the pixel electrodes 13. Therefore, the display color of each pixel becomes equal to the color of the phosphorescent light emitted from a corresponding one of the fluorescent film sections 21R, 21G, and 21B. In addition, the chromaticity of the display color increases with the amount of the phosphorescent material 213 in the fluorescent film 21.

Since the phosphorescent material 213 also emits phosphorescent light by light except for light having a wavelength in a visible light range, the phosphorescent light emitted from the fluorescent film 21 is light having a high luminance. Therefore, a bright display can be obtained in the presence of an electric field.

As is generally known, in a TFT liquid crystal display device, during a selection period of a given row, a pulse voltage is applied to the corresponding gate line GL to turn on the TFTs 14 on the selected row, and a gradation voltage corresponding to a display gradation level is applied to a drain line DL at the same timing. With this operation, a voltage corresponding to the gradation voltage is held between the corresponding pixel electrode 13 and the counter electrode 20 until the next selection period, and an electric field is continuously applied to the cholesteric liquid crystal 32. Therefore, the liquid crystal display device of this embodiment controls a voltage applied to the drain line DL during each selection period of each row to control the aligned states of the liquid crystal molecules MA, thereby controlling transmission and scattering of light and displaying an arbitrary color image.

In the polymer dispersed liquid crystal film with the above arrangement, in the absence of an electric field, the molecules MA of the cholesteric liquid crystal 32, as shown in FIG. 4A, are aligned to be twisted at a specific helical pitch p, and twisting axes have random directions in units of small areas. In this manner, the randomness of alignment of the liquid crystal molecules MA is high. For this reason, the refractive index of the polymer resin 31 is largely different from that of the cholesteric liquid crystal 32, and incident light is largely refracted at the interface between the polymer resin 31 and the cholesteric liquid crystal 32, thereby increasing the scattering efficiency of light. Therefore, the display becomes sufficiently dark.

In the presence of an electric field, the liquid crystal molecules MA are uniformly aligned perpendicular to the major surface of the substrate as in the prior art. Therefore, the refractive index of the cholesteric liquid crystal 32 becomes almost equal to that of the polymer resin 31, and incident light is transmitted through the polymer dispersed liquid crystal film 30 while almost no incident light is scattered, thereby making a display bright.

Therefore, according to this embodiment, a color image having a dark display darker than that of the prior art and a bright display brighter than that of the prior art can be displayed at a high contrast.

When an electric field is applied to the cholesteric liquid crystal 32, depending on the strength of the applied electric field, the cholesteric liquid crystal 32 is aligned in the direction of the electric field within a relatively short time. When the application of the electric field is stopped, a twisting force strongly acts between the liquid crystal molecules. For this reason, the aligned state of the liquid crystal molecules is quickly returned to a twisted/aligned state. Therefore, in the polymer dispersed liquid crystal display device of the present invention, both of a response speed at which a dark display changes to a bright display and a response speed at which a bright display changes to a dark display are high. A liquid crystal display device having a total high response speed can be obtained, and a write time for each pixel can be shortened to increase a frame frequency, thereby smoothly displaying a dynamic image or the like.

The helical pitch p of the cholesteric liquid crystal 32 is preferably shorter (more preferably, sufficiently shorter) than a mean diameter d of a liquid crystal portion (liquid crystal domain) 33 of the polymer dispersed liquid crystal film 30, e.g., a space in which the liquid crystal 32 of the polymer resin 31 is confined. If the helical pitch p of the cholesteric liquid crystal 32 and the mean diameter d of the liquid crystal portion 33 satisfy p< d, as shown in FIG. 4A, a plurality of domains respectively having helical axes of different directions are formed in the liquid crystal portion 33. For this reason, light can be more effectively scattered.

In the liquid crystal display device of the embodiment, the counter electrode 20 is constituted by an electrode also serving as a light-reflecting film. The fluorescent film 21 which emits phosphorescent light when light is incident on the fluorescent film 21 is formed on the counter electrode 20. For this reason, light incident on the upper surface of the polymer dispersed liquid crystal display device is reflected by the counter electrode 20 without being transmitted through the counter substrate 12, and the reflected light is transmitted through the fluorescent film 21 to cause the fluorescent film 21 to emit phosphorescent light. For this reason, a bright display becomes brighter by the phosphorescent light. Therefore, since a dark display becomes darker as described above, a display having a high contrast can be obtained. More specifically, this polymer dispersed liquid crystal display device can obtain a display much brighter than that of a liquid crystal display device using a conventional color filter which transmits only light having a predetermined wavelength but absorbs light having a wavelength other than the predetermined wavelength.

A method of manufacturing the active matrix liquid crystal display device having the above arrangement will be described next.

First, a metal film is deposited on the active element substrate 11. The metal film is then patterned to form the gate electrodes 15 and the gate lines GL. An insulating film consisting of SiN or the like is deposited on the entire surface of the active element substrate 11 by the CVD method or the like to form the gate insulating film 16. An intrinsic semiconductor such as a-Si is deposited on the gate insulating film 16 by the CVD method or the like. This semiconductor film is patterned to form the semiconductor films 17 each opposing the gate electrode 15. Thereafter, the source and drain electrodes 18 and 19 which are in contact with the semiconductor film 17 are formed. Furthermore, the drain lines DL connected to the drain electrodes 19 are formed.

A light-transmitting conductive film consisting of ITO (Indium Tin Oxide) or the like is formed on the entire surface of the active element substrate 11 by sputtering or the like, and this conductive film is patterned to form the pixel electrodes 13 each connected to the source electrode 18.

A film consisting of a light-reflecting conductive material such as aluminum, chromium, or the like is formed on the counter substrate 12. This film is patterned to form the counter electrode 20.

A film obtained by mixing a photo-setting transparent resin material for, e.g., the resin base material 211 of the fluorescent film 21 and the fluorescent material 213 for emitting fluorescent light having a predetermined color, e.g., red, at a predetermined ratio is coated on the entire surface of the counter substrate 12 by spin coating, printing, or the like to have a predetermined film thickness. Thereafter, ultraviolet rays or the like are radiated on the transparent resin material to pattern it into a predetermined shape, thereby forming the red fluorescent film sections 21R in the form of a matrix. Subsequently, a mixture of a transparent resin material and the green fluorescent material 213 is coated on the entire surface of the counter substrate 12 and patterned to form the green fluorescent film sections 21G in the form of a matrix. The blue fluorescent film sections 21B are also formed in the same manner as described above.

The active element substrate 11 and the counter substrate 12 are joined to each other via the sealing member SC. A solution mixture of a polymeric material which causes a polymerization reaction when it is irradiated with light and a cholesteric liquid crystal is injected and filled between the active element substrate 11 and the counter substrate 12 via an opening formed in a portion of the seal member SC by a vacuum injection method. Ultraviolet rays are radiated on the solution mixture filled between the substrates 11 and 12 from the active element substrate 11 side. Upon radiation of the ultraviolet rays, a radical polymerization reaction takes place in which the double bonds of the polymeric material in the form of a monomer or oligomer dissociate into radicals, and radicals of adjacent molecules combine. As a result, the polymeric material becomes the polymer resin 31. In the process of this reaction, phase-separation of the polymer resin 31 and the twisted/aligned cholesteric liquid crystal 32 takes place. As a result, the formed polymer resin 31 has a sponge- or network-like sectional structure, and the liquid crystal 32 is confined in spaces in the polymer resin 31, thus forming the polymer dispersed liquid crystal film 30 composed of the liquid crystal and the polymer resin and having above-described structure. The injection opening formed in the sealing member SC is sealed after the solution mixture is filled or the polymer dispersed liquid crystal film 30 is completed. Note that this method of forming the polymer dispersed liquid crystal film 30 is called a photo-polymerization phase-separation method.

The reflection active matrix color polymer dispersed liquid crystal display device having the arrangement shown in FIG. 1 is completed by the above process.

The above-described manufacturing method is an example, and other manufacturing methods may be employed.

In the polymer dispersed liquid crystal display device with the above arrangement, a guest-host type liquid crystal display device is obtained by adding a dichroic dye to the cholesteric liquid crystal 32. In this case, scattered light in the absence of an electric field is absorbed by the dichroic dye. Therefore, a dark display can be close to black, thereby increasing the contrast of the display image. As a dichroic dye, a two-tone black dye such as an azo or anthraquinonedye having positive absorption anisotropy is preferably used. The content of the dichroic dye with respect to the cholesteric liquid crystal is preferably set to be about 0.5 to 8 wt %.

Figure 5A:
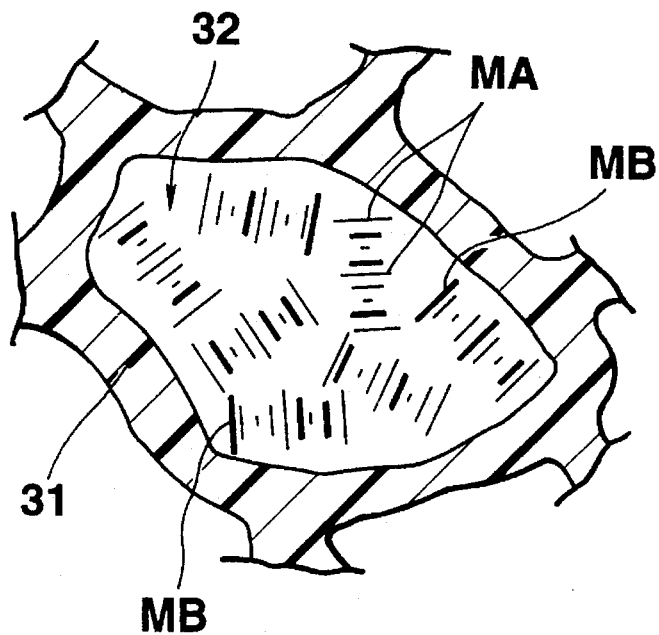
FIG. 5A is an enlarged view showing part of a modification of the polymer dispersed liquid crystal film shown in FIG. 1 to explain the aligned state of cholesteric liquid crystal molecules and a dichroic dye in the absence of an electric field.
Figure 5B:
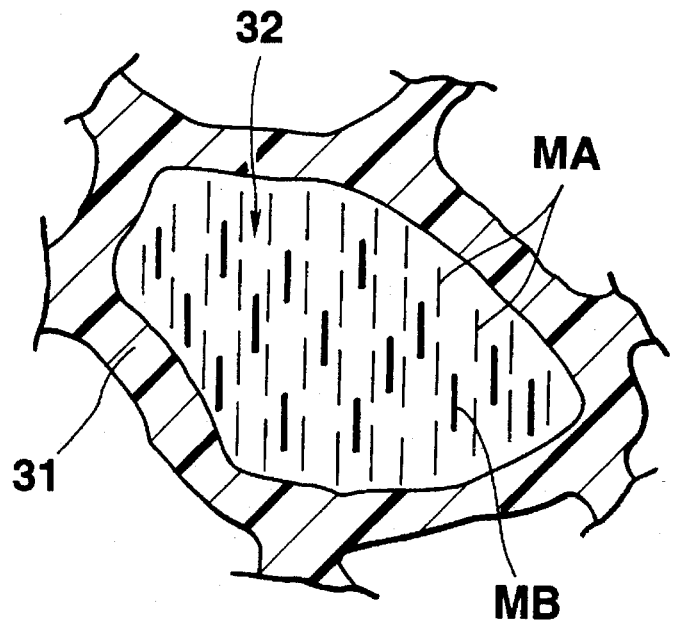
FIG. 5B is an enlarged view showing part of a modification of the polymer dispersed liquid crystal film shown in FIG. 1 to explain the aligned state of cholesteric liquid crystal molecules and a dichroic dye in the presence of an electric field.

FIGS. 5A and 5B are enlarged sectional views respectively showing portions of the polymer dispersed liquid crystal film 30 having a structure in which a dichroic dye is added to the cholesteric liquid crystal 32. The polymer dispersed liquid crystal film 30 has a structure obtained by dispersing the polymer resin 31 and the cholesteric liquid crystal 32 to which a two-tone black dye is added.

As in this embodiment, when the two-tone black dye is added to the cholesteric liquid crystal 32, in the absence of an electric field, as shown in FIG. 5A, dichroic dye molecules MB are set in an almost twisted/aligned state in accordance with the twisted alignment of the molecules MA of the cholesteric liquid crystal 32, and the molecules MB have mean random directions. For this reason, when incident light is transmitted through the polymer dispersed liquid crystal film 30, the light is scattered due to the difference between the refractive indexes of the polymer resin 31 and the liquid crystal 32, and most of the scattered light is absorbed by the dichroic dye molecules MB. Therefore, the display becomes an almost black display.

On the other hand, when an electric field is applied to the polymer dispersed liquid crystal film 30, as shown in FIG. 5B, the dichroic dye molecules MB are almost vertically aligned with the vertical alignment of the molecules MA of the cholesteric liquid crystal 32. For this reason, in the presence of an electric field, almost no light transmitted through the polymer dispersed liquid crystal film 30 is absorbed by the dichroic dye molecules MB.

For this reason, when a dichroic dye is added to the cholesteric liquid crystal 32, the dark display becomes darker than the dark display of the arrangement in FIG. 1, and the bright display is almost equal to that of the arrangement in FIG. 1. Therefore, the contrast of the display image becomes higher.

In the above embodiment, in order to display a bright color image, the fluorescent film sections 21R, 21B, and 21B of different colors are arranged on the counter electrode 20. However, the fluorescent film 21 for emitting monochromatic phosphorescent light may be arranged on the counter electrode 20. In this case, although a color image cannot be displayed, a bright monochromatic image can be displayed because the fluorescent film 21 absorbs visible light and invisible light such as ultraviolet rays to emit phosphorescent light of a predetermined color.

Figure 6:
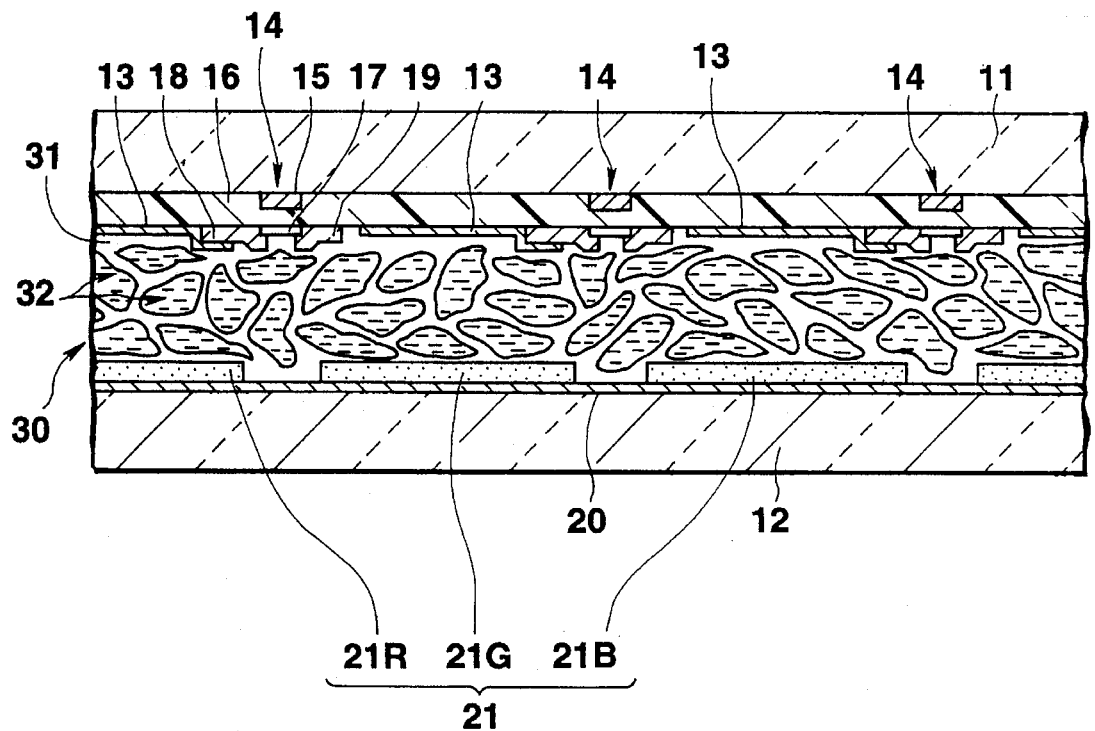
FIG. 6 is a sectional view showing a modification of the polymer dispersed liquid crystal display device shown in FIG, 1 to show an example in which fluorescent films are arranged on a counter electrode in units of pixels.

In the above embodiment, although the fluorescent film 21 (film sections 21R, 21G, and 21B) is formed on the counter electrode 20, for example, as shown in FIG. 6, each of the fluorescent film sections may be arranged in each pixel area on the counter electrode 20.

Figure 7:
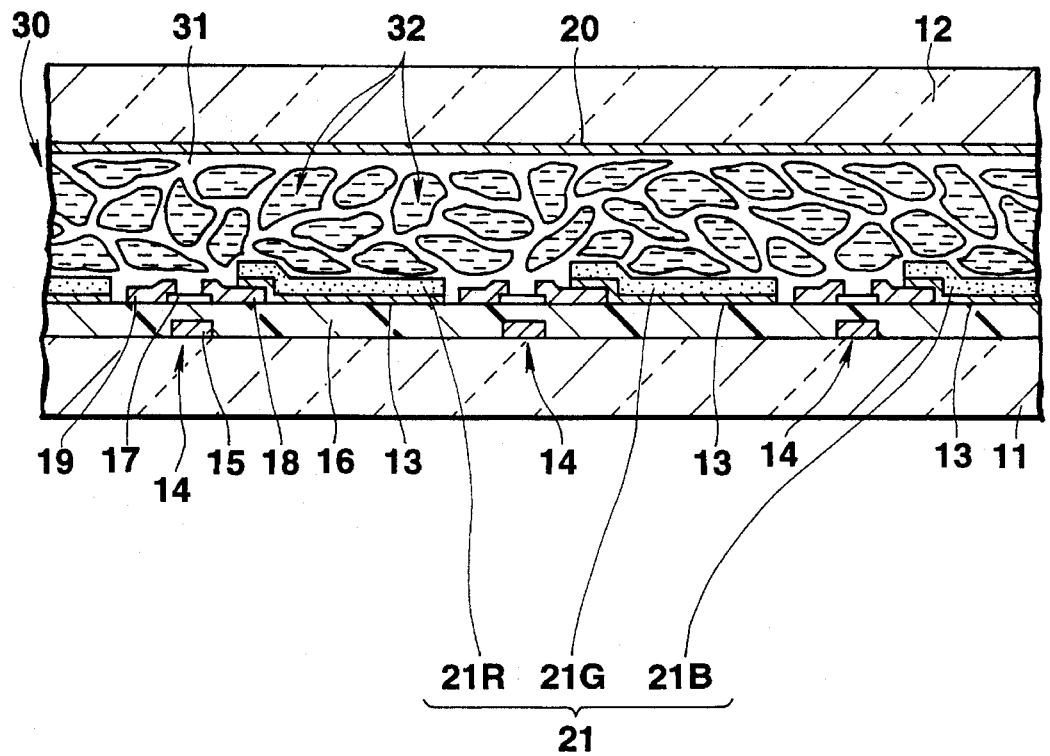
FIG. 7 is a sectional view showing the first modification of the polymer dispersed liquid crystal display device shown in FIG, 1 in which fluorescent films are respectively arranged on pixel electrodes also serving as light-reflecting films.
Figure 8:
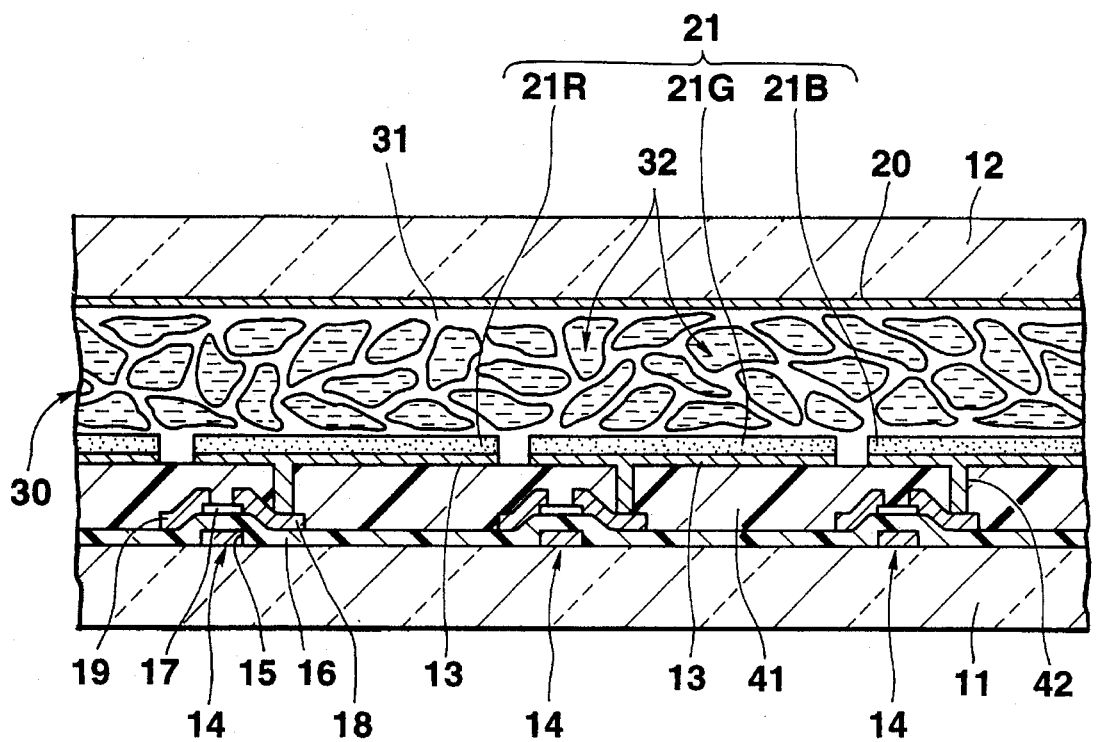
FIG. 8 is a sectional view of the second modification of the polymer dispersed liquid crystal display device shown in FIG. 1 in which fluorescent films are arranged on pixel electrodes.
Figure 9:
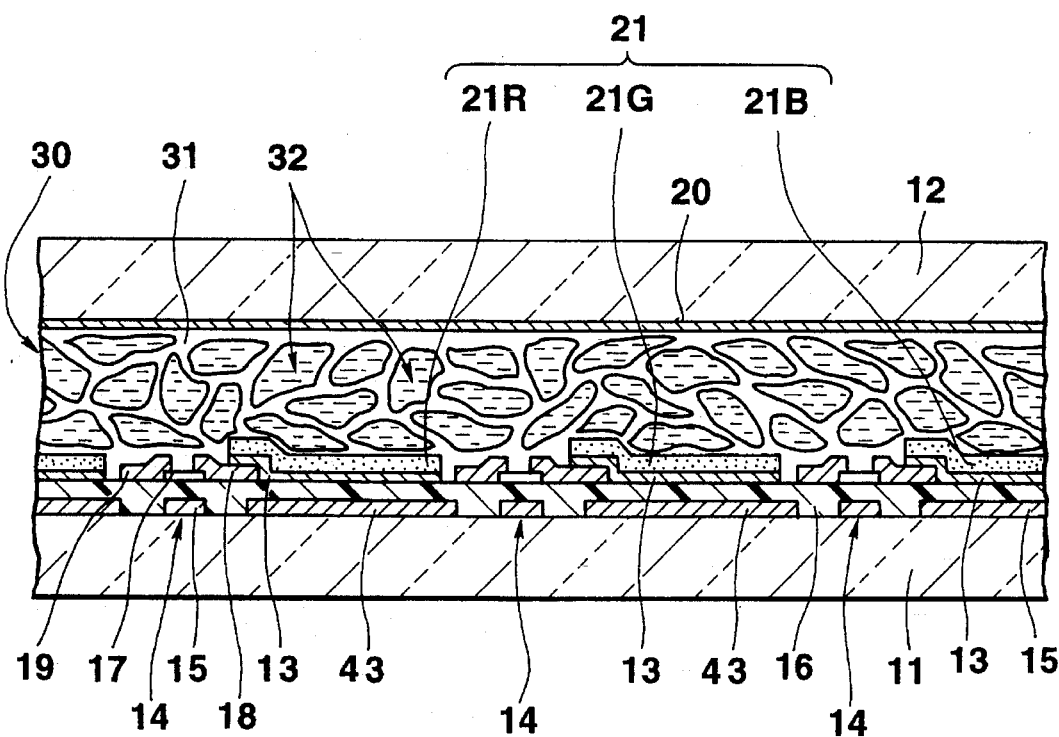
FIG. 9 is a sectional view of the third modification of the polymer dispersed liquid crystal display device shown in FIG. 1 in which fluorescent films are arranged on pixel electrodes.

In addition, the fluorescent film 21, as shown in FIGS. 7 to 9, may be arranged on the active element substrate 11 side.

In the arrangement of FIG. 7, the counter electrode 20 is constituted by a transparent electrode consisting of ITO or the like, and each pixel electrode 13 is constituted by a light-reflecting electrode consisting of aluminum, chromium, or the like, is formed on the gate insulating film 16, and also serves as a light-reflecting film. The fluorescent film 21 (film sections 21R, 21G, and 21B) is formed on the pixel electrodes 13. The counter substrate 12 serving as a substrate on which light is incident is constituted by a transparent substrate, and the active element substrate 11 need not be a transparent substrate.

In the arrangement of FIG. 8, the counter electrode 20 is constituted by a transparent electrode consisting of ITO or the like, and an insulating protective film 41 is formed on the TFTs 14. The light-reflecting pixel electrodes 13 each consisting of aluminum, chromium, or the like are arranged on the insulating protective film and respectively connected to the source electrodes via contact holes 42 formed in the insulating protective film 41. The fluorescent film 21 (film sections 21R, 21G, and 21B) is arranged on the pixel electrodes 13. The counter substrate 12 is constituted by a transparent substrate, and the active element substrate 11 need not be a transparent substrate.

In the arrangement of FIG. 9, the counter electrode and the pixel electrodes 13 are constituted by transparent electrodes each consisting of ITO or the like. The pixel electrodes 13 are formed on the gate insulating film 16, and the fluorescent film 21 (film sections 21R, 21G, and 21B) is formed on the pixel electrodes 13. Conductive light-reflecting films 43 respectively opposing the pixel electrodes 13 via the gate insulating film 16 are formed on the active element substrate 11. When a reference voltage is applied to the conductive light-reflecting films 43, compensation capacitors (storage capacitors) can be formed by the conductive light-reflecting films 43 and, the pixel electrodes 13, and the part of the gate insulating film 16 positioned therebetween.

In each of the arrangements of FIGS. 1 and 6 to 9, although the fluorescent film 21 is arranged on the side of the reflecting substrate, the fluorescent film 21 may be arranged on a substrate on a light-incident side. In addition, the fluorescent film 21 need not be arranged.

Figure 10:
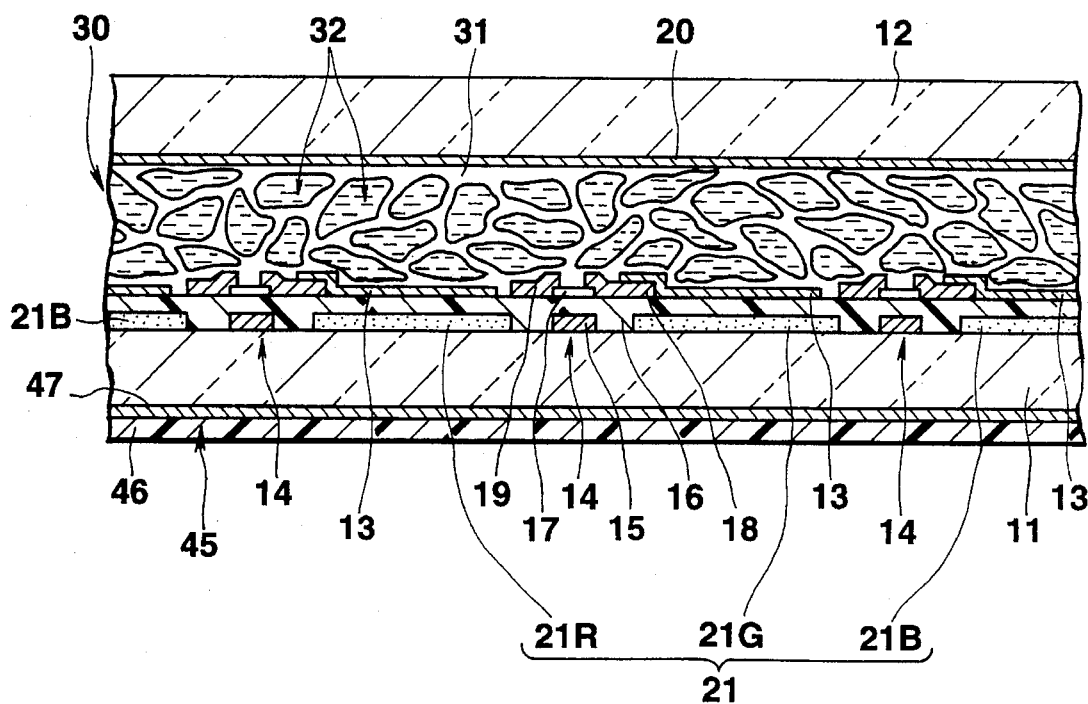
FIG. 10 is a sectional view of still another modification of the polymer dispersed liquid crystal display device shown in FIG. 1 to exemplify a reflection polymer dispersed liquid crystal display device having a reflecting film formed on the outer surface of one substrate.

The present invention, for example, as shown in FIG. 10, can also be applied to a reflection liquid crystal display device in which a reflecting film 45 is formed on the outer surface of one of the active element substrate 11 and the counter substrate 12. In this case, light-transmitting electrodes are used as the pixel electrodes 13 and the counter electrode 20, and transparent substrates are used as the active element substrate 11 and the counter substrate 12.

In FIG. 10, the reflecting film 45 is formed by arranging a light-reflecting metal foil 47 on a resin film 46.

The present invention can also be applied to a transmission liquid crystal display device having no reflecting film. For example, in each of the arrangements of FIGS. 1 and 6 to 9, when transparent substrates are used as the active element substrate 11 and the counter substrate 12, and the transparent electrodes are used as the pixel electrodes 13 and the counter electrode 20, a transmission device can be obtained.

The polymer dispersed liquid crystal film 30 in the above embodiment has a structure in which the cholesteric liquid crystal 32 is confined in each space in the polymer resin 31 having a network-like sectional structure. However, the polymer dispersed liquid crystal film 30, as shown in FIG. 11, may have a structure in which liquid crystal capsules obtained by micro-encapsulating a cholesteric liquid crystal are dispersed in a polymer resin film.

Figure 11:
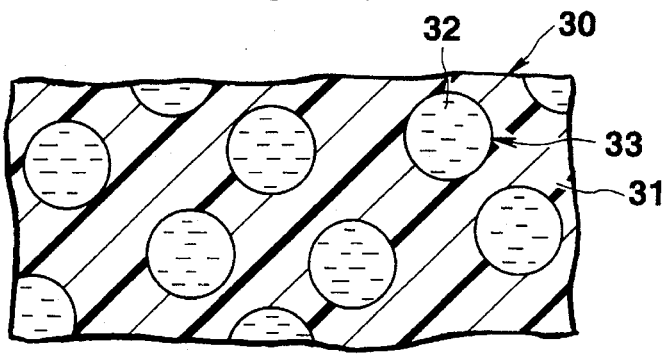
FIG. 11 is a sectional view showing the arrangement of a polymer dispersed liquid crystal film having an encapsulated liquid crystal.

The polymer dispersed liquid crystal film 30 having the structure shown in FIG. 11 can be formed using the above phase-separation method when the content of the cholesteric liquid crystal with respect to a polymer material is set to be 40 to 60%.

In addition, an encapsulated liquid crystal material is formed using the known method disclosed in U.S. Pat. No. 4,435,047 (Fergason) or the like. An encapsulated liquid crystal material 33 is mixed into an aqueous polyvinyl alcohol (PVA) solution, and the resultant mixture is coated on one substrate and dried, thereby forming polymer dispersed liquid crystal film 30. Thereafter, the other substrate may be adhered to the resultant structure via a spacer and a seal member.

In the above embodiment, an active matrix polymer dispersed liquid crystal display device using the active elements 14 as TFTs has been described. The present invention can also be applied to an active matrix polymer dispersed liquid crystal display device using MIMs or the like as active elements.

Figure 12:
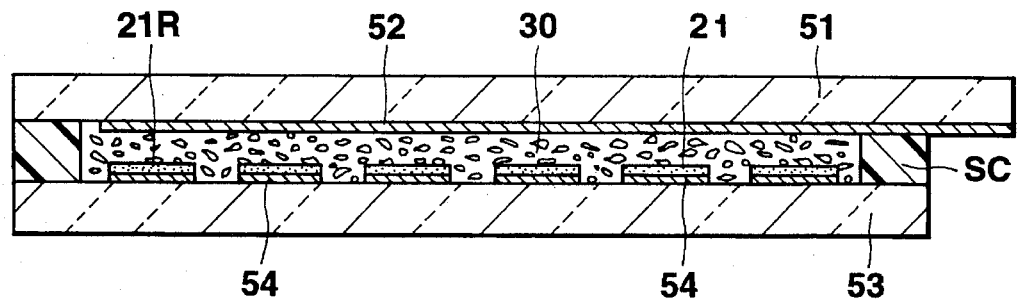
FIG. 12 is a sectional view showing the arrangement of a simple matrix polymer dispersed liquid crystal display device.
Figure 13A:
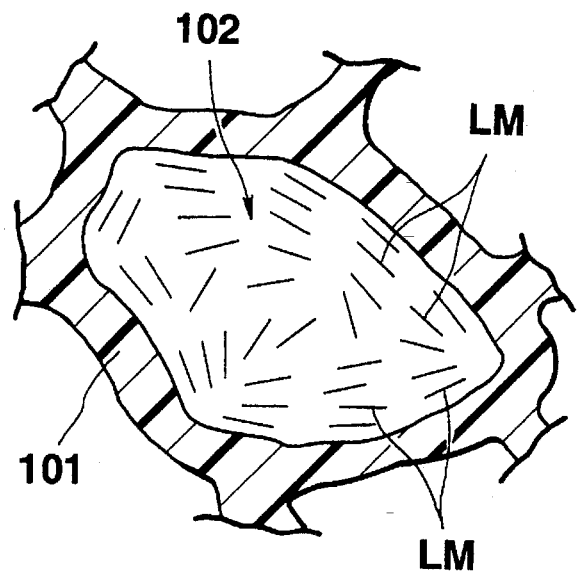
FIG. 13A is an enlarged view showing part of a conventional polymer dispersed liquid crystal film to explain the aligned state of nematic liquid crystal molecules in the absence of an electric field.
Figure 13B:
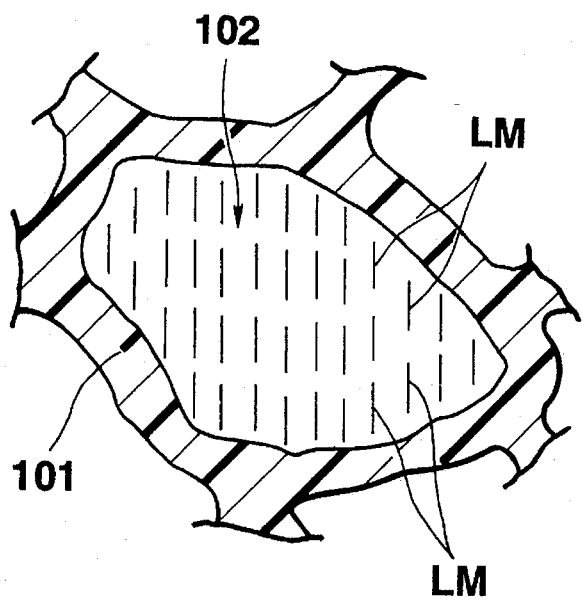
FIG. 13B is an enlarged view showing part of a conventional polymer dispersed liquid crystal film to explain the aligned state of nematic liquid crystal molecules in the presence of an electric field.

The present invention can also be applied to a simple matrix polymer dispersed liquid crystal display device in which, as shown in FIG. 12, a common electrode 52 is arranged on one substrate 51, and segment electrodes 54 opposing the common electrode 52 are arranged on the other substrate 53. The fluorescent film 21 is mounted on the segment electrodes. When the simple matrix liquid crystal display device is to be multiplexed and driven, the bright display can change into a dark display within a short time. For this reason, the simple matrix liquid crystal display device can be driven at a high duty ratio.

In addition, the present invention is not limited to the above embodiment, and various modifications and applications of the present invention can be effected.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A polymer dispersed liquid crystal display device comprising:

a pair of substrates arranged to oppose one another and having electrodes respectively formed on opposing surfaces of said pair of substrates; and a polymer dispersed liquid crystal film arranged between said pair of substrates and formed by dispersing a polymer resin and a cholesteric liquid crystal, wherein said polymer dispersed liquid crystal film has a plurality of domains of said cholesteric liquid crystal in said polymer dispersed liquid crystal film, and a mean diameter d of said liquid crystal domains is larger than a helical pitch p of said cholesteric liquid crystal.

2. A device according to claim 1, wherein said cholesteric liquid crystal is a guest-host type liquid crystal containing a dichroic dye.

3. A device according to claim 1, wherein said polymer resin has a network-like structure, and said cholesteric liquid crystal is filled in the network-like structure.

4. A device according to claim 1, wherein said polymer resin contains microcapsules, and said cholesteric liquid crystal is filled in said microcapsules in said polymer resin.

5. A device according to claim 1, further comprising a fluorescent film, arranged between said pair of substrates to correspond to said electrodes, for emitting fluorescent light.

6. An active matrix polymer dispersed liquid crystal display device comprising:

a first substrate on which active elements and pixel electrodes respectively connected thereto are arranged in the form of a matrix;

a second substrate arranged to oppose said first substrate and having a counter electrode formed on a surface, of said second substrate, opposing said first substrate; and a polymer dispersed liquid crystal film arranged between said first substrate and said second substrate and formed by dispersing a polymer resin and a cholesteric liquid crystal wherein said polymer dispersed liquid crystal film has a plurality of domains of said cholesteric liquid crystal in said polymer dispersed liquid crystal film, and a mean diameter d of said liquid crystal domains is larger than a helical pitch p of said cholesteric liquid crystal.

7. A device according to claim 6, wherein said cholesteric liquid crystal is a guest-host type liquid crystal containing a dichroic dye.

8. A device according to claim 6, further comprising a fluorescent film, arranged between said first substrate and said second substrate to correspond to said pixel electrodes, for emitting fluorescent light.

9. A device according to claim 8, wherein said fluorescent film is formed on said second substrate.

10. A device according to claim 9, wherein said counter electrode consists of a light-reflecting conductive material, and said fluorescent film is formed on a counter electrode side.

11. A device according to claim 8, wherein said fluorescent film is formed on said first substrate.

12. A device according to claim 11, wherein each of said pixel electrodes consists of a light-reflecting conductive material, and said fluorescent film is formed on a pixel electrode side.

13. A device according to claim 6, further comprising reflecting means for reflecting light incident thereon, arranged outside one of said first substrate and said second electrode.

14. A polymer dispersed liquid crystal display device comprising:

a polymer dispersed liquid crystal film, including a cholesteric liquid crystal, for controlling transmission and scattering of incident light in accordance with an applied electric field to display an image, wherein said polymer dispersed liquid crystal film has a plurality of domains of said cholesteric liquid crystal in said polymer dispersed liquid crystal film, and a mean diameter d of said liquid crystal domains is larger than a helical pitch p of said cholesteric liquid crystal; and electric field applying means for applying an electric field to said polymer dispersed liquid crystal film in accordance with the display image.

15. A device according to claim 14, wherein said cholesteric liquid crystal containing a dichroic dye, and said polymer dispersed liquid crystal film controls scattering, absorption, and transmission of incident light in accordance with an applied electric field to display an image.

* * * * *